US010702937B2

(12) United States Patent
Heuser (10) Patent No.: US 10,702,937 B2
(45) Date of Patent: Jul. 7, 2020

(54) METHODS OF FORMING EARTH-BORING TOOLS, METHODS OF AFFIXING CUTTING ELEMENTS TO EARTH-BORING TOOLS

(71) Applicant: Baker Hughes, a GE company, LLC, Houston, TX (US)

(72) Inventor: William H. Heuser, Bangkok (TH)

(73) Assignee: Baker Hughes, a GE company, LLC, Houston, TX (US)

( * ) Notice: Subject to any disclaimer, the term of this patent is extended or adjusted under 35 U.S.C. 154(b) by 137 days.

(21) Appl. No.: 15/269,621

(22) Filed: Sep. 19, 2016

(65) Prior Publication Data

US 2017/0008112 A1 Jan. 12, 2017

Related U.S. Application Data

(62) Division of application No. 14/063,780, filed on Oct. 25, 2013, now Pat. No. 9,481,033.

(51) Int. Cl.
| | |
|---|---|
| *B22D 19/02* | (2006.01) |
| *B23K 1/00* | (2006.01) |
| *B23K 1/20* | (2006.01) |
| *B23K 31/02* | (2006.01) |
| *B22D 19/00* | (2006.01) |
| *E21B 10/567* | (2006.01) |

(Continued)

(52) U.S. Cl.
CPC ............ *B23K 1/0008* (2013.01); *B22D 19/00* (2013.01); *B22D 19/02* (2013.01); *B23K 1/20* (2013.01); *B23K 31/025* (2013.01); *E21B 10/567* (2013.01); *E21B 10/633* (2013.01); *E21B 10/55* (2013.01)

(58) Field of Classification Search
CPC ........ B23K 1/0008; B23K 1/20; B23K 1/025; B22D 19/02; B22D 19/00; B24D 99/005; E21B 10/573; E21B 10/5673; E21B 10/55; E21B 10/663; E21B 10/567
USPC ........... 76/106; 299/113, 108; 175/368, 412, 175/413, 432, 426, 429
See application file for complete search history.

(56) References Cited

U.S. PATENT DOCUMENTS

| | | | |
|---|---|---|---|
| 4,334,585 A | 6/1982 | Upton | |
| 4,417,833 A * | 11/1983 | Wertheimer | ............ B23C 5/006 407/61 |
| 4,654,947 A | 4/1987 | Davis | |

(Continued)

FOREIGN PATENT DOCUMENTS

EP 581534 A1 3/1997

*Primary Examiner* — Ghassem Alie
(74) *Attorney, Agent, or Firm* — TraskBritt (57) ABSTRACT

An earth-boring tool may include a body having at least one blade, and at least one cutting element recess may be formed in a surface of the at least one blade. At least one cutting element may be affixed within the at least one cutting element recess. The at least one cutting element may comprise a substantially cylindrical lateral side surface configured to allow the at least one cutting element to rotate about a longitudinal axis within the at least one cutting element recess when the at least one cutting element is partially inserted into the at least one cutting element recess. The at least one cutting element may also include a back face comprising alignment features configured to abut complementary alignment features disposed on a back surface of the at least one cutting element recess. Methods of forming earth-boring tool bodies.

17 Claims, 5 Drawing Sheets

(51) Int. Cl.
*E21B 10/633* (2006.01)
*E21B 10/55* (2006.01)

(56) References Cited

U.S. PATENT DOCUMENTS

| | | | |
|---|---|---|---|
| 4,782,903 A | 11/1988 | Strange | |
| 4,877,096 A | 10/1989 | Tibbitts | |
| 5,285,859 A | 2/1994 | Tibbitts | |
| 5,435,403 A | 7/1995 | Tibbitts | |
| 5,678,645 A * | 10/1997 | Tibbitts | E21B 10/5673 |
| | | | 175/426 |
| 5,906,245 A | 5/1999 | Tibbitts et al. | |
| 6,241,035 B1 | 6/2001 | Portwood | |
| 6,283,234 B1 | 9/2001 | Torbet | |
| 6,561,293 B2 | 5/2003 | Minikus et al. | |
| 6,834,733 B1 | 12/2004 | Maouche et al. | |
| 7,070,011 B2 | 7/2006 | Sherwood, Jr. et al. | |
| 7,216,565 B2 | 5/2007 | Sherwood, Jr. et al. | |
| 8,011,456 B2 | 9/2011 | Sherwood, Jr. | |
| 8,136,887 B2 * | 3/2012 | Hall | E21C 35/183 |
| | | | 299/105 |
| 8,327,955 B2 | 12/2012 | Patel | |
| 2002/0074168 A1 | 6/2002 | Matthias et al. | |
| 2004/0173384 A1 | 9/2004 | Yong et al. | |
| 2005/0089440 A1 * | 4/2005 | Kembaiyan | B23B 27/148 |
| | | | 420/502 |
| 2006/0278441 A1 | 12/2006 | Cooley et al. | |
| 2008/0017419 A1 | 1/2008 | Cooley et al. | |
| 2009/0020339 A1 * | 1/2009 | Sherwood, Jr. | E21B 10/43 |
| | | | 175/426 |
| 2009/0256413 A1 * | 10/2009 | Majagi | B28D 1/188 |
| | | | 299/100 |
| 2010/0000798 A1 * | 1/2010 | Patel | B23K 1/0008 |
| | | | 175/426 |
| 2010/0314176 A1 * | 12/2010 | Zhang | E21B 10/573 |
| | | | 175/383 |
| 2010/0326741 A1 * | 12/2010 | Patel | B24D 99/005 |
| | | | 175/431 |
| 2012/0273280 A1 * | 11/2012 | Zhang | E21B 10/573 |
| | | | 175/428 |
| 2013/0092455 A1 | 4/2013 | Patel | |
| 2013/0199856 A1 * | 8/2013 | Bilen | E21B 10/43 |
| | | | 175/331 |
| 2015/0114727 A1 | 4/2015 | Heuser | |

* cited by examiner

METHODS OF FORMING EARTH-BORING TOOLS, METHODS OF AFFIXING CUTTING ELEMENTS TO EARTH-BORING TOOLS

CROSS-REFERENCE TO RELATED APPLICATION

This application is a divisional of U.S. patent application Ser. No. 14/063,780, filed Oct. 25, 2013, now U.S. Pat. No. 9,481,033, issued Nov. 1, 2016 the disclosure of which is hereby incorporated herein in its entirety by this reference.

TECHNICAL FIELD

Embodiments of the disclosure relate to cutting elements for earth-boring tools, to earth-boring tools including such cutting elements, and to methods of fabricating such cutting elements and tools.

BACKGROUND

Earth-boring tools are used to form boreholes (e.g., wellbores) in subterranean formations. Such earth-boring tools include, for example, drill bits, reamers, mills, etc. For example, a conventional fixed-cutter earth-boring rotary drill bit may include a bit body having generally radially projecting and longitudinally extending blades. A plurality of cutting elements may be positioned on each of the blades. Generally, the cutting elements have either a disk shape or a cylindrical shape. The cutting elements may include a layer or "table" of superabrasive material, such as polycrystalline diamond, formed on or attached to a supporting substrate made from a hard material, such as cemented tungsten carbide. Such cutting elements may be referred to as "polycrystalline diamond compact" (PDC) cutting elements. The PDC cutting elements may be secured to the body of an earth-boring tool, such as a drill bit, within cutting element pockets, or recesses, formed in rotationally leading surfaces of each of the blades. Conventionally, the cutting elements are secured in the recesses of the bit body by a braze alloy.

The bit body of a fixed-cutter earth-boring rotary drill bit may be made from, for example, a metal alloy (e.g., steel) or a particle-matrix composite material such as cemented tungsten carbide. Steel bit bodies are generally fabricated using standard machining processes. Particle-matrix composite bit bodies are typically manufactured by forming a graphite mold having a mold cavity therein, filling the cavity of the graphite mold with tungsten carbide particles, and infiltrating the tungsten carbide particles with a molten metallic alloy such as bronze. The molten alloy infiltrates through the tungsten carbide particles, after which the molten alloy cools and solidifies to form a continuous matrix phase in which the tungsten carbide particles are cemented. The surfaces of the graphite mold within the cavity may include recesses or pockets formed by, e.g., milling and/or drilling, and displacements may be inserted therein. The displacements may include, for example, graphite, silica, or another material that will withstand the temperatures of the casting process, but that can also be subsequently removed from the bit body as discussed below. The displacements may extend into the interior of the mold cavity to create cutting element pockets in the bit body corresponding to the size and shape of the cutting elements to be installed in the bit body. The displacements may be sized to provide a small annular clearance between the cutting element and the pocket to facilitate fixing the cutting elements into the recesses of the bit body.

After the bit body is formed and the graphite mold is removed, the displacements are removed from the cutting element pockets of the bit body, and cutting elements are brazed into the cutting element pockets. In the brazing process, a cutting element is positioned within a cutting element pocket, and molten braze material is applied to the interface between the cutting element and the pocket in the bit body. The cutting element is rotated within the pocket to distribute the molten braze material around the circumference of the cutting element and over the entire interface between the cutting element and the surfaces of the bit body within the pocket. The braze material is then allowed to cool and solidify to secure the cutting element within the pocket. Worn or failed cutting elements may be replaced in bit bodies by heating and melting the braze material to release the cutting element from the pocket. The pocket then may be cleaned and repaired as needed, after which a new cutting element may be secured to the bit body within the pocket using the brazing method described above.

Fixed-cutter earth-boring rotary drill bits may be configured for use in different formation materials by altering various parameters, such as the size and shape of the cutting elements, the number of cutting elements, and the orientation at which each cutting element is carried by the bit body with respect to the formation. For example, each cutting element may be oriented such that a cutting face of the cutting element forms a particular angle with a plane tangent to the formation at the location of contact with the cutting element. This angle is commonly referred to as a "back rake angle." Cutting elements with different back rake angles may be suited for engaging different formation materials. Generally, cutting elements oriented at low back rake angles are more aggressive and remove formation material at a relatively higher rate, while cutting elements oriented at high back rake angles are less aggressive, and remove formation material at a relatively lower rate. Cutting elements oriented at aggressive low back rake angles, however, may wear and suffer damage quickly when drilling through hard formations. Thus, cutting elements with less-aggressive high back rake angles may be well-suited for use in relatively hard formation materials such as limestone, dolomite, sandstone, etc., as they allow sufficient cutting action without causing substantial, rapid degradation to the cutting elements. Conversely, cutting elements with aggressive low back rake angles may be better suited for drilling through relatively softer formations, as they may be used to drill at a higher rate-of-penetration (ROP) without experiencing substantial wear and degradation.

The back rake angle of the cutting elements is conventionally established by adjusting the orientation of the cutting element pockets formed in the bit body into which the cutting elements are affixed. Thus, unique bit bodies must be designed and fabricated for efficient drilling into formations of differing hardness.

BRIEF SUMMARY

An earth-boring tool may comprise a body having at least one blade, and at least one cutting element recess formed in a surface of the at least one blade. At least one cutting element may be affixed within the at least one cutting element recess. The at least one cutting element may comprise a substantially cylindrical lateral side surface configured to allow the at least one cutting element to rotate about a longitudinal axis within the at least one cutting element recess when the at least one cutting element is partially inserted into the at least one cutting element recess. The at least one cutting element may also comprise a back face opposite a cutting face along the longitudinal axis of the at least one cutting element. The back face may comprise alignment features configured to abut complementary alignment features of a back surface of the at least one cutting element recess and preclude rotation of the at least one cutting element about the longitudinal axis when the at least one cutting element is fully inserted into the at least one cutting element recess.

A method of affixing a cutting element to an earth-boring tool may comprise partially inserting the cutting element into a recess formed in the earth-boring tool, applying a molten braze material to a clearance between a lateral side of the cutting element and a lateral side of the recess, rotating the cutting element about a longitudinal axis within the recess, and fully inserting the cutting element within the recess. At least one alignment feature of a back face of the cutting element may abut at least one complementary alignment feature of a back surface of the recess and rotationally align the cutting element about the longitudinal axis within the recess to a predetermined rotational orientation.

A method of forming a body of an earth-boring tool may comprise forming a mold having a mold cavity including a shape corresponding to a shape of the body of the earth-boring tool to be formed. A first portion of at least one displacement may be inserted into at least one recess extending into the mold within the mold cavity. A second portion of the at least one displacement may project into the mold cavity and have a generally cylindrical shape corresponding to a generally cylindrical shape of at least a portion of a cutting element to be attached to the body of the earth-boring tool to be formed. The at least one displacement may be aligned with respect to the mold by rotating the at least one displacement about a longitudinal axis of the at least one displacement. The at least one displacement may be affixed within the at least one recess.

BRIEF DESCRIPTION OF THE DRAWINGS

While the specification concludes with claims particularly pointing out and distinctly claiming what are regarded as embodiments of the present invention, advantages of the embodiments may be more readily ascertained from the following description of certain example embodiments when read in conjunction with the accompanying drawings in which:

DETAILED DESCRIPTION

The illustrations presented herein are not actual views of any particular earth-boring tool or components thereof, but are merely idealized representations that are employed to describe embodiments of the present disclosure. Additionally, elements common between figures may retain the same numerical designation.

The present disclosure relates to cutting elements for earth-boring tools that may advantageously be formed to include asymmetrical features on cutting faces thereof. For example, cutting elements of the present disclosure may include multiple angled planar surfaces formed on the cutting face to enhance drilling efficiency by preventing buildup of formation cuttings on the face of the cutting element. Cutting elements of the present disclosure may also include cutting faces formed at an angle with respect to a longitudinal axis of the cutting element to enable the cutting element to exhibit a back rake angle or side rake angle substantially independent of the orientation of the pockets or recesses of the earth-boring tool into which the cutting elements are secured. Cutting elements according to the present disclosure may also include alignment features of a back face opposite the cutting face along the longitudinal axis of the cutting element, and recesses in the earth-boring tool may include complementary alignment features. The alignment features may interact to ensure that the asymmetrical features of the cutting face are oriented correctly with respect to the earth-boring tool to provide, for example, improved clearing of formation cuttings or a desired back rake angle.

Figure 1:
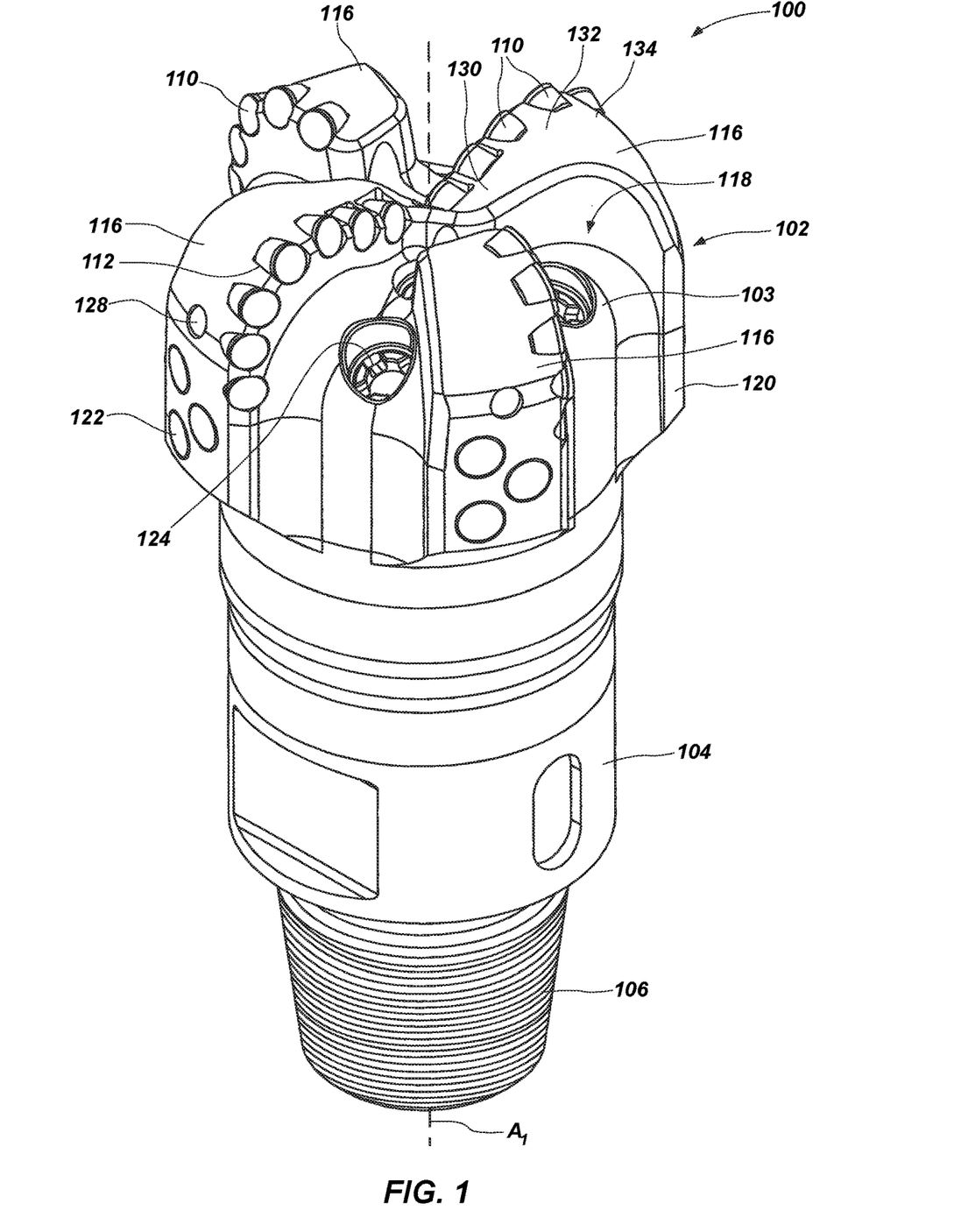
FIG. 1 is a perspective view of an embodiment of an earth-boring tool of the present disclosure.

Referring to FIG. 1, a perspective view of an earth-boring tool 100 is shown. The earth-boring tool 100 may include a bit body 102 secured to a shank 104 having a connection portion 106 (e.g., an American Petroleum Institute (API) threaded connection) configured to attach the earth-boring tool 100 to a drill string (not shown). In some embodiments, the bit body 102 may comprise a particle-matrix composite material, and may be secured to the shank 104 using a metal blank embedded within the particle-matrix composite bit body 102. Threads may be machined on the metal blank, and the shank 104 then may be threaded onto the metal blank to attach the bit body 102 to the shank 104. In other embodiments, the bit body 102 may be formed from a steel alloy, and the bit body 102 may be threaded directly to the shank 104. The bit body 102 may include internal fluid passageways extending between a face 103 of the bit body 102 and a longitudinal bore, which extends through the shank 104 and partially through the bit body 102. Nozzle inserts 124 also may be provided at the face 103 of the bit body 102 in fluid communication with the fluid passageways.

The bit body 102 may include blades 116 that are separated by fluid courses (also referred to as "junk slots") 118 defined between the blades 116. Each blade 116 may extend from a location proximate an axis of rotation $A_1$ of the earth-boring tool 100 radially outward over the face 103 of the bit body 102 to a gage region 120, which may define a radially outermost portion of the bit body 102. Cutting elements 110 may be secured to the bit body 102. In some embodiments, the cutting elements 110 may be located partially in recesses or "pockets" 112 that are located along rotationally leading portions of each of the blades 116 distributed over the face 103 of the bit body 102. The cutting elements 110 may be positioned to cut a subterranean earth formation being drilled while the earth-boring tool 100 is rotated under applied weight (e.g., weight-on-bit (WOB)) in a borehole about the axis of rotation $A_1$. In some embodiments, the earth-boring tool 100 may include gage wear plugs 122 and wear knots 128 secured to the bit body 102 in a gage region 120. Cutting elements 110 also may be secured to the bit body 102 in the gage region 120.

One or more of the blades 116 may include a cone region 130 at a radially innermost portion of the blade 116. The blade 116 may extend away from the face 103 of the bit body 102, imparting to the cone region 130 a substantially conic shape. Each blade 116 may also include a nose region 132 adjacent to and radially outward from the cone region 130. The blade 116 may continue to extend away from the bit body 102, but the slope at which the blade 116 extends may gradually decrease within the nose region 132. The blade 116 may include a shoulder region 134 adjacent to and radially outward from the nose region 132. The blade 116 may reach its apex within the shoulder region 134 and may begin to curve back toward the face 103 of the bit body 102. Finally, each blade 116 may include a gage region 120, located adjacent to and radially outward from the shoulder region 134. The gage region 120 may define the radially outermost portion of the blade 116. The bit body 102 may be formed, and the cutting elements 110 secured within recesses 112 as previously described.

In some aspects of the present disclosure, cutting elements 110 affixed to the bit body 102 may include cutting features that are asymmetric with respect to a longitudinal axis of the cutting element 110. For example, each cutting element 110 may include one or more planar cutting surfaces oriented at a non-orthogonal angle to the longitudinal axis of the cutting element 110. Moreover, each cutting element 110 may include a superabrasive material table covering only a portion of a leading face of the tungsten carbide supporting substrate.

Figures 2, 4:
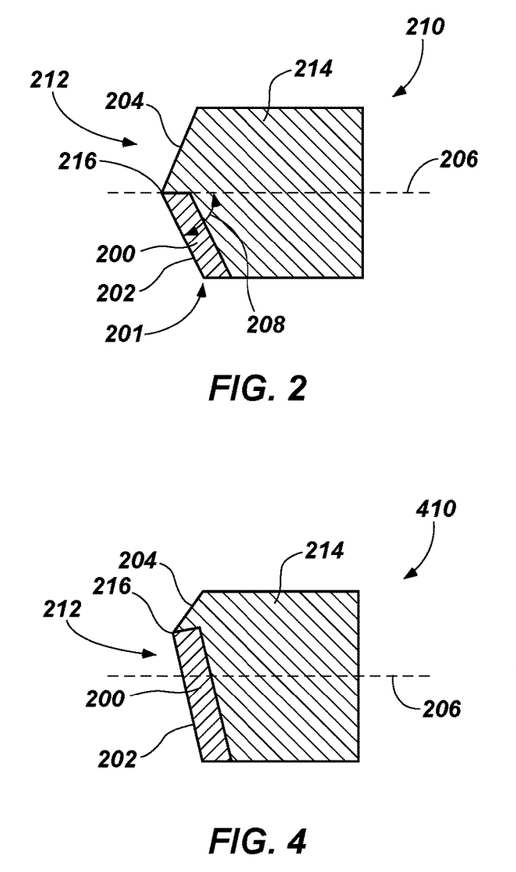
FIGS. 2 through 6 are cross-sectional views of embodiments of cutting elements of the present disclosure.

Referring now to FIG. 2, a superabrasive material table 200 of a cutting element 210 may have a planar cutting surface 202 oriented at an acute angle 208 with respect to a longitudinal axis 206 of the cutting element 210. A cutting edge 201 of the cutting element 210 may be defined at an intersection between the planar cutting surface 202 and a lateral side of the cutting element 210. A second planar surface 204 may be formed on a leading face 212 of the cutting element 210. The second planar surface 204 may be formed orthogonal to or at an acute angle to the longitudinal axis 206 of the cutting element 210. The superabrasive material table 200 may not cover the second planar surface 204, such that the second planar surface 204 is exposed cemented tungsten carbide of a supporting substrate 214. In some aspects of the disclosure, the planar surfaces 202 and 204 may be symmetrical about the longitudinal axis 206 of the cutting element 210, the planar surfaces 202 and 204 together forming a "V" shape in which a point or apex 216 of the V-shape leads in a direction of instantaneous cutting element movement. The apex 216 of the V-shape may intersect the longitudinal axis 206 of the cutting element 210, or it may be located proximate to the longitudinal axis 206 of the cutting element 210. For example, the apex 216 of the V-shape may be separated from the longitudinal axis 206 by a distance that is less than about 20% of a diameter of the cutting element 210, less than about 10% of a diameter of the cutting element 210, or even less than about 5% of a diameter of the cutting element 210. Such a configuration may reduce "balling," a condition in which formation cuttings build up on a cutting face and around a cutting element as the cutting element advances through the formation, which results in reduced cutting efficiency. Formation cuttings generated at the cutting edge 201 will slide across the planar cutting surface 202 to the apex 216, at which time they will become unsupported due to the orientation of the surface 204, which may cause them to fall away from the cutting element 210. Thus, formation chips may be required to travel a shorter distance before clearing from the planar cutting surface 202 as compared to a conventional cutting surface. This may prevent buildup of formation chips and thus may encourage efficient formation cutting and enhance rate-of-penetration (ROP) of the earth-boring tool 100 (FIG. 1). Furthermore, the cost of manufacturing related to the production of superabrasive material may be reduced, as each cutting element 210 requires less superabrasive material than a comparable conventional cutting element having superabrasive material covering the entire cutting face.

Figures 3, 5:
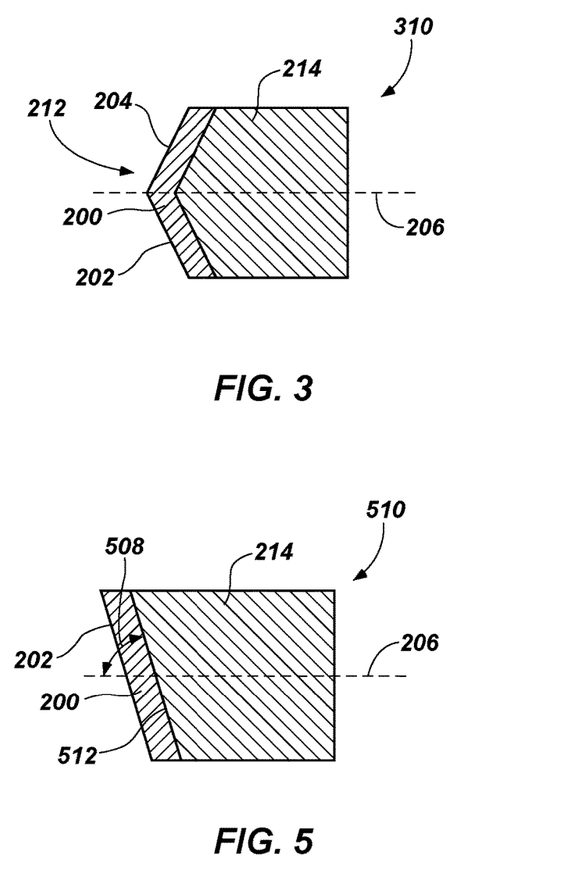

In other embodiments, the superabrasive material may cover both the planar cutting surface and the second planar surface. For example, in the embodiment shown in FIG. 3, the superabrasive material table 200 may entirely cover the leading face 212 of a cutting element 310. The planar cutting surface 202 and the second planar surface 204 may comprise surfaces of the superabrasive material table 200. In the embodiment shown in FIG. 3, the surface area of planar surfaces 202 and 204 are substantially equal.

In other embodiments, the surfaces 202 and 204 may have unequal surface areas and/or unequal angles with respect to the longitudinal axis 206 of a cutting element. In yet other embodiments, the superabrasive material may cover less than or more than 50% of the leading face 212 of a cutting element. For example, FIG. 4 shows a cutting element 410 with a planar cutting surface 202 formed on superabrasive material table 200 and a second planar surface 204 formed on a leading face 212 of the cutting element 410. In the embodiment of FIG. 4, the planar cutting surface 202 has a surface area greater than the surface area of the second planar surface 204. The planar cutting surface 202 and the second planar surface 204 may abut to form an apex 216. The apex 216 may be separated from a longitudinal axis 206 of the cutting element 410 by, for example, a distance of greater than about twenty percent (20%) of a diameter of the cutting element 410, a distance of greater than fifty percent (50%) of the diameter of the cutting face, or more.

In other aspects of the disclosure, a continuous planar cutting face may be formed at an acute angle with respect to a longitudinal axis of a cutting element to provide a back rake angle substantially independent of the orientation of the recesses 112 in the bit body 102 (FIG. 1). For example, referring now to FIG. 5, a cutting element 510 may include a superabrasive material table 200 with a substantially constant thickness, and a leading face 512 of the tungsten carbide supporting substrate 214 may be positioned at an acute angle 508 with respect to the longitudinal axis 206 of the cutting element 510.

Figure 6:
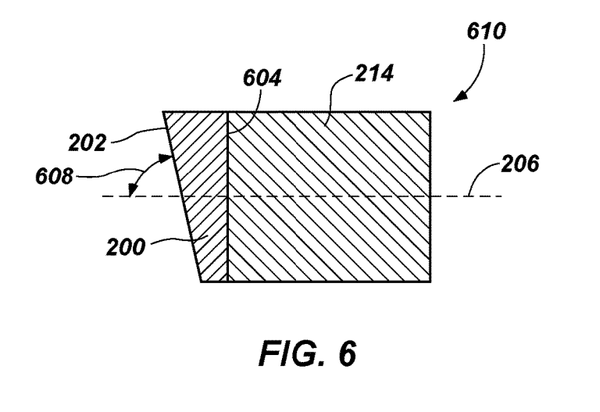

Alternatively, referring now to FIG. 6, a cutting element 610 may include a superabrasive material table 200 with a planar cutting surface 202 and a trailing face 604 oriented in a non-parallel relationship, such that the superabrasive material table 200 has a variable thickness. The varied thickness of the superabrasive material table 200 may establish an acute angle 608 between the longitudinal axis 206 of the cutting element 610 and the planar cutting surface 202 of the superabrasive material table 200.

The angle at which the superabrasive material table 200 and the planar cutting surface 202 are oriented with respect to the longitudinal axis 206 of the cutting elements 210, 310, 410, 510, and 610 may be chosen at least in part to achieve a desired back rake angle of the cutting element. Positioning the planar cutting surface 202 at an acute angle 208 with respect to the longitudinal axis 206 of the cutting element allows the back rake angle of the cutting elements to be defined independently of the orientation of the cutter recesses 112 in the bit body 102 (FIG. 1). In this manner, different cutting face back rake angles and consequently different overall drill bit aggressiveness can be obtained from the same molded bit body 102 simply by installing cutting elements with the desired back rake angles when manufacturing the drill bit, or by replacing worn cutting elements that have certain back rake angle with new cutting elements having a different back rake angle when desired. For example, a drill bit manufacturer may provide a single bit body design accompanied by a wide range of cutting elements having different cutting face back rake angles. Cutting elements may then be chosen based on the desired overall "aggressiveness" of the earth-boring tool 100 (FIG. 1), thus enabling use of a single bit body design in various formations with substantially different physical characteristics simply by choosing and installing different cutting elements.

Additionally, the orientation of the planar cutting surface 202 with respect to the longitudinal axis may be chosen to provide the cutting element 210 with a side rake angle. Side rake angle may be formed by rotating the cutting element face about an axis in the plane of the cutting element face perpendicular to the axis about which the cutting element face is rotated to achieve back rake. According to the present disclosure, the orientation of the planar cutting surface may be chosen to exhibit a back rake angle, a side rake angle, or both a back rake angle and a side rake angle.

Figure 7:
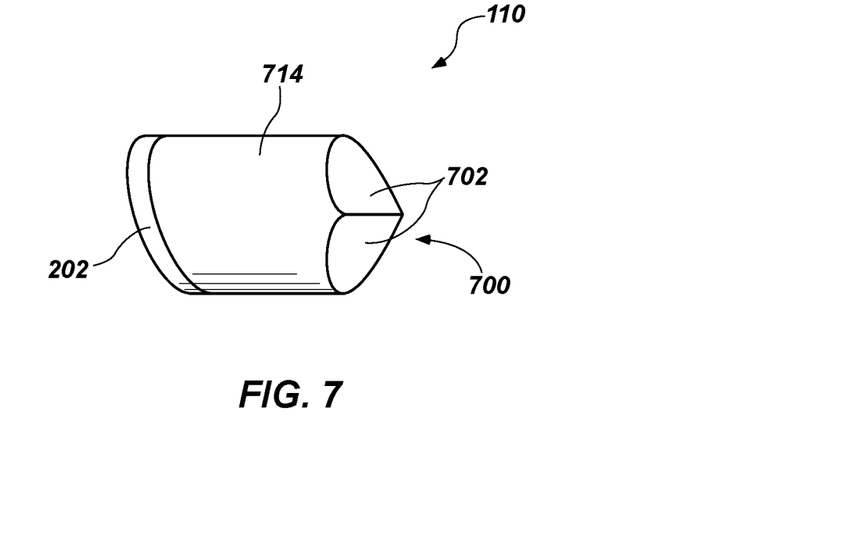
FIG. 7 is a perspective view of an embodiment of a cutting element according to the present disclosure.

To ensure that the asymmetrical features on the cutting elements present the desired back rake angle and/or side rake angle to the formation being drilled, the cutting elements may need to be rotationally aligned with the bit body along the longitudinal axis of the cutting element. Referring now to FIG. 7, a cutting element 110 may also include alignment features on a back face 700 opposite the planar cutting surface 202. The alignment features may be configured to rotationally align each cutting element 110 with respect to the bit body 102 by interacting with complementary alignment features in the recess 112 of the bit body 102 (FIG. 1). For example, the back face of each cutting element 110 may include beveled surfaces 702. The beveled surfaces 702 may be formed in a tungsten carbide supporting substrate 714 by grinding, milling, or other machining operations. Alternatively, the beveled surfaces 702 may be molded into the tungsten carbide supporting substrate 714 during a sintering operation.

Figure 8:
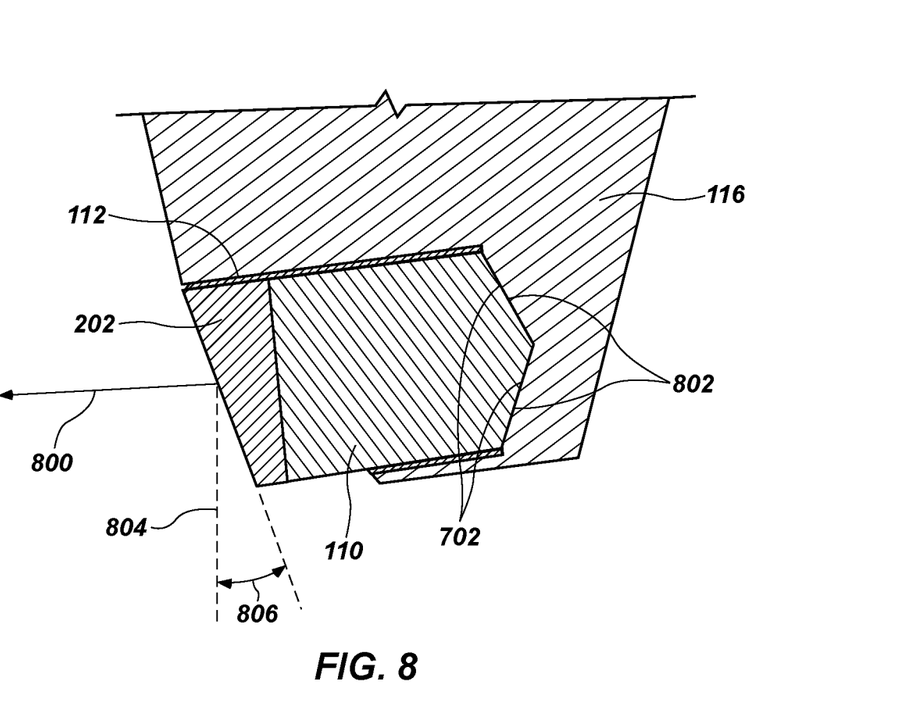
FIG. 8 is a cross-sectional view of an embodiment of a cutting element and a blade of an earth-boring tool of the present disclosure.

With reference now to FIG. 8, a corresponding beveled surface 802 may be formed in the back of the recess 112 formed in the blade 116 of the bit body 102 (FIG. 1) to establish a rotational alignment of the cutting element 110 with respect to the bit body 102 when the beveled surfaces 702 of the cutting element 110 are substantially coplanarly aligned with the beveled surfaces 802 in the recess 112. The beveled surfaces 802 may have substantially the same shape, area, and angle with respect to a longitudinal axis 206 (FIG. 2) of the cutting element 110 as the beveled surfaces 702 of the cutting element 110. The beveled surfaces 702 formed on the cutting element 110 and the matching beveled surfaces 802 formed in the recess 112 of the blade 116 may include a single beveled surface, two beveled surfaces, or three or more beveled surfaces. In some aspects of the disclosure, the beveled surfaces 702 and 802 may be symmetrical about the longitudinal axis of the cutting element 110. Beveled surfaces 702 and 802 that are symmetrical about the longitudinal axis may enable the cutting element 110 to be installed in the recess 112 in multiple discrete orientations corresponding to the number of beveled surfaces 702 and 802. For example, a cutting element with two symmetrical beveled surfaces 702 may be installed in a recess 112 with two matching symmetrical beveled surfaces 802 in two discrete rotational positions 180 degrees apart. A cutting element with three beveled surfaces symmetrical about the longitudinal axis 206 may be installed in three rotational positions 120 degrees apart, a cutting element with four symmetrical beveled surfaces may be installed in four rotational positions 90 degrees apart, and so forth.

In other aspects, the beveled surfaces 702 and 802 may be asymmetrical about a plane passing through the longitudinal axis to ensure that the cutting element 110 can be fully inserted in the recess 112 only in a single, predetermined rotational orientation. For example, the two beveled surfaces 702 and 802 may abut at a point separated from the longitudinal axis 206 of the cutting element 110 by a distance of, for example, about twenty percent (20%) of a diameter of the cutting element 110. In other embodiments, the point at which the beveled surfaces 702 and 802 abut may be separated from the longitudinal axis by a distance of less than or more than twenty percent (20%) of the diameter of the cutting element 110.

With continued reference to FIG. 8, the cutting element 110 may be secured on the blade 116 in an orientation such that the planar cutting surface 202 of the cutting element 110 exhibits a back rake angle 806 with respect to a dashed line 804. The dashed line 804 may be defined as a line that extends (in the plane of FIG. 8) radially outward from the cutting element 110 in a direction substantially perpendicular to an instantaneous cutting direction 800 of the cutting element 110. The back rake angle 806 may be measured relative to the dashed line 804, positive angles being measured in the counterclockwise direction, negative angles being measured in the clockwise direction. Cutting elements exhibiting negative back rake angles 806 may be referred to as "positive rake" cutting elements.

The beveled surfaces 702 of the cutting elements 110 and the complementary beveled surfaces 802 of the cutter recesses 112 may interact to ensure that a cutting element 110 with an asymmetrical planar cutting surface 202 is aligned correctly with respect to the bit body 102 (FIG. 1) to enable the cutting element 110 to present the desired back rake angle to the formation as the bit body 102 rotates and the cutting elements 110 engage and degrade the formation. In some aspects, cutting elements 110 positioned on the cone region 130, the nose region 132, the shoulder region 134, and the gage region 120 of the blade 116 (FIG. 1) may include different angles between the planar cutting surface 202 and longitudinal axis 206 to provide different back rake angles in the different regions of the blade 116. Cutting elements 110 positioned in different regions of the blade 116 may also include different angular orientations between the planar cutting surface 202 and the alignment features at the back face 700 (FIG. 7) of the cutting element 110 depending on the profile angle of the blade 116 at the location at which the cutting element 110 is to be installed. Furthermore, because the back rake angle of the cutting elements 110 can be defined independently of the orientation of the longitudinal axis 206 of the cutting element, as described above in connection with cutting elements 210, 310, 410, 510, and 610 (FIGS. 2 through 6), the longitudinal axis 206 of the individual cutting elements 110 may be oriented to maximize diamond density in critical areas of the blade 116, such as the nose region 132 (FIG. 1). Conventionally, when cutting elements across the nose region 132 (FIG. 1) of a blade 116 are oriented with substantial back rake, the cutting faces of adjacent cutting elements 110 may have to be positioned with undesirable clearances therebetween to prevent interference between ends of the cutting elements 110 opposite the cutting faces. In some aspects of the present disclosure, cutting elements 110 on the nose region 132 may be positioned with longitudinal axes 206 substantially parallel to one another enabling closer spacing and higher diamond density, and the desired back rake may be provided by angled planar cutting surfaces 202.

Figure 9:
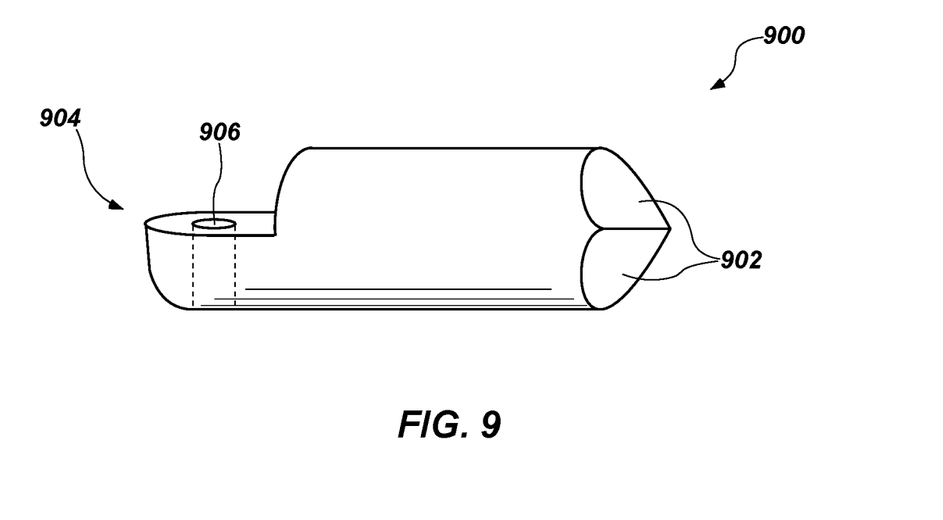
FIG. 9 is a perspective view of a mold displacement according to the present disclosure.

The beveled surfaces 802 in the back of the recess 112 of the bit body 102 (FIG. 1) may be formed during manufacture of the bit body 102. For example, a mold displacement 900 (FIG. 9) may be provided with beveled surfaces 902 matching the beveled surfaces 702 on the cutting element 110 (FIG. 7). A graphite mold 1000 (FIG. 10) with a negative profile of the desired shape of the bit body 102 (FIG. 1) may be prepared, and recesses 1004 may be formed, for example, with a ball mill or end mill, in the mold 1000 at the desired cutting element positions and orientations. A nose portion 904 of the mold displacement 900 may then be inserted in the recesses 1004 formed in the mold 1000, leaving a portion of the displacement 900 including the beveled surfaces 902 (FIG. 9) extending into an interior cavity 1006 of the mold 1000. The mold displacements 900 may be formed from materials conventionally used in casting operations, such as, for example, silica particles mixed with clay or another refractory binder and compacted to the desired shape. The diameter of the mold displacements 900 may be chosen based on the diameter of the cutting elements 110 and the desired clearance between each cutting element 110 and the walls of the recess 112 (FIG. 8). Clearance between the cutting elements 110 and the inner walls of the recesses 112 may form an annular space between the components suitable for brazing.

Figure 10:
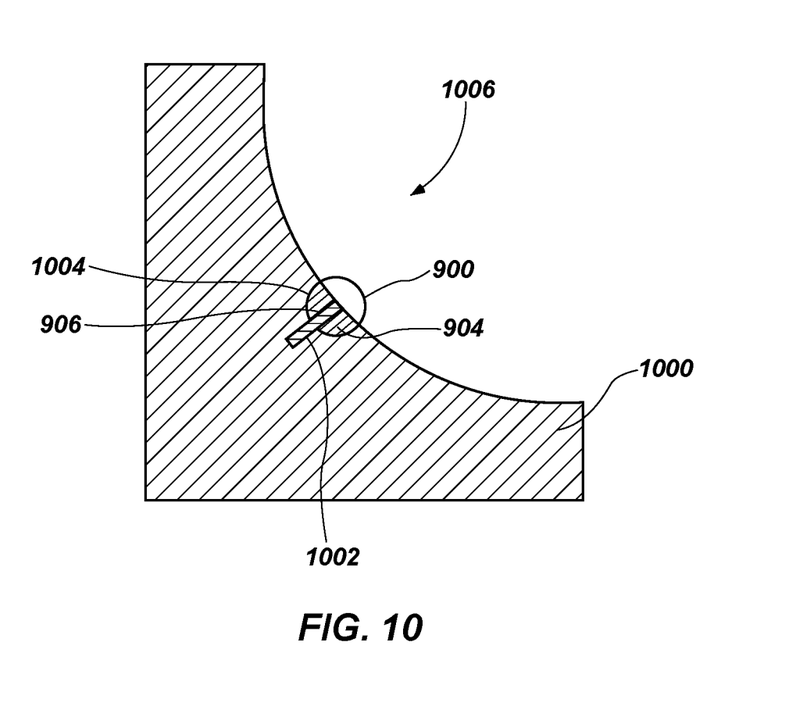
FIG. 10 is a cross-sectional view of an embodiment of a mold and the mold displacement of FIG. 9.

The mold displacements 900 may include features configured to align the mold displacements 900 with respect to the mold 1000. For example, the mold displacements 900 may include a hole 906 formed in the nose portion 904. In some aspects, the mold displacements 900 may be positioned within the mold 1000 in the desired position and orientation, and an alignment hole 906 may then be bored through the nose portion 904 of the displacement 900 and into the graphite mold 1000. A graphite alignment pin 1002 may then be inserted through the hole 906 extending through the nose portion 904 of the mold displacement 900 and into the mold 1000 to align the displacement 900 and ensure that the displacement 900 maintains correct orientation in the mold 1000 as tungsten carbide particles and alloy binder are introduced into the mold 1000 to form the bit body 102 (FIG. 1). The graphite alignment pin 1002 may be inserted from an interior side of the mold 1000 as shown in FIG. 10, or may be inserted through a hole or passageway in an exterior of the mold 1000. Additionally or alternatively, a chemical adhesive (e.g., an epoxy), may be used to retain the displacements in the mold.

Figure 11:
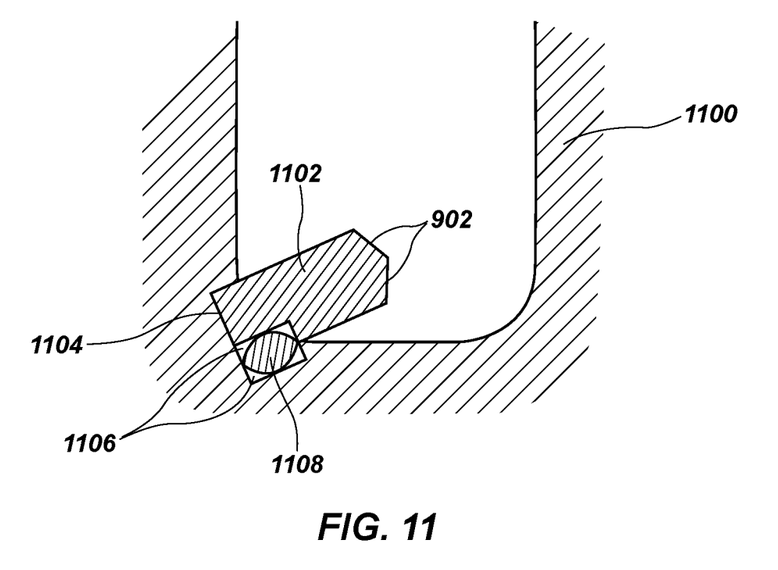
FIG. 11 is a cross-sectional view of another embodiment of a mold and a mold displacement.

In other aspects of the disclosure, the mold displacements may be aligned within the mold with a key slot and key. For example, FIG. 11 shows a graphite mold 1100 with a recess 1104 formed with, for example, an end mill. A flat bottom displacement 1102 may be inserted into the recess 1104, and the flat bottom displacement 1102 and the recess 1104 may both include a key slot 1106. A key 1108 may be disposed within the key slots 1106 to ensure the beveled surfaces 902 are aligned correctly with respect to the graphite mold 1100.

Once the alloy binder has been melted, allowed to infiltrate the spaces between the tungsten carbide particles, cooled, and solidified, the graphite mold 1000 and the displacements 900 may be removed from the molded bit body. Cutting elements 110 may then be affixed (e.g., brazed) within the recesses 112 of the bit body 102 (FIG. 1) left after removal of the displacements 900. In one aspect of the disclosure, a cutting element may be partially inserted into a recess 112 of the bit body 102, and the cutting element may be rotated within the recess 112 while heat is applied to the cutting element, the recess, and a braze material, until the braze material becomes molten and is drawn into the annulus between the cutting element 110 and the recess 112. Before the braze material solidifies, the cutting element may be pressed fully into the recess 112 so that the beveled surfaces 702 (FIG. 7) of the cutting element 110 interact with the beveled surfaces 802 (FIG. 8) at the back of the recess 112 to rotationally align the cutting element 110 with respect to the bit body 102. Prior to pressing the cutting element 110 fully into the recess 112, the cutting element 110 may be aligned to within a certain rotational distance of the final desired orientation to ensure that interaction between the beveled surfaces 702 and 802 orients the cutting element 110 to the desired final orientation. For example, the cutting element 110 may be oriented to within about forty-five (45) degrees of the final desired orientation before the cutting element is pressed fully into the recess 112. In other embodiments, the cutting element 110 may be oriented to within more or less than forty-five (45) degrees from the final desired orientation. For example, the cutting element 110 may be oriented to between about seventy-five (75) degrees or more and about five (5) degrees or less from the final desired orientation prior to pressing the cutting element 110 fully into the recess 112.

Additional non-limiting example embodiments of the disclosure are set forth below.

Embodiment 1

An earth-boring tool, comprising: a body having at least one blade, at least one cutting element recess formed in a surface of the at least one blade; and at least one cutting element affixed within the at least one cutting element recess, the at least one cutting element comprising: a substantially cylindrical lateral side surface configured to allow the at least one cutting element to rotate about a longitudinal axis within the at least one cutting element recess when the at least one cutting element is partially inserted into the at least one cutting element recess; and a back face opposite a cutting face along the longitudinal axis of the at least one cutting element, the back face comprising at least one alignment feature configured to abut at least one complementary alignment feature of a back surface of the at least one cutting element recess and preclude rotation of the at least one cutting element about the longitudinal axis when the at least one cutting element is fully inserted into the at least one cutting element recess.

Embodiment 2

The earth-boring tool of Embodiment 1, wherein the cutting face of the at least one cutting element is asymmetrical with respect to the longitudinal axis of the cutting element.

Embodiment 3

The earth-boring tool of Embodiment 2, wherein the cutting face comprises a superabrasive material table covering less than the entire cutting face.

Embodiment 4

The earth-boring tool of Embodiments 2 or 3, wherein the cutting face of the at least one cutting element comprises a planar cutting surface oriented at an acute angle with respect to the longitudinal axis of the cutting element.

Embodiment 5

The earth-boring tool of Embodiment 4, wherein the cutting face further comprises a second planar surface oriented at an acute angle with respect to the longitudinal axis of the cutting element.

Embodiment 6

The earth-boring tool of Embodiment 5, wherein the cutting element comprises a superabrasive material table extending only over the planar cutting surface.

Embodiment 7

The earth-boring tool of Embodiments 5 or 6, wherein the cutting element comprises a superabrasive material table extending over the planar cutting surface and the second planar surface.

Embodiment 8

The earth-boring tool of any one of Embodiments 5 through 7, wherein the planar cutting surface and the second planar surface abut to form an apex on the cutting face.

Embodiment 9

The earth-boring tool of Embodiment 8, wherein the apex intersects the longitudinal axis of the cutting element.

Embodiment 10

The earth-boring tool of Embodiment 8, wherein the apex intersects a point separated from the longitudinal axis of the cutting element by a distance greater than about five percent (5%) of a diameter of the cutting element.

Embodiment 11

The earth-boring tool of any one of Embodiments 1 through 10, wherein the at least one alignment feature of the back face of the cutting element and the at least one complementary alignment feature of the recess each comprise one or more beveled surfaces.

Embodiment 12

The earth-boring tool of Embodiment 11, wherein the at least one alignment feature of the back face and the at least one complementary alignment feature of the recess each comprise two beveled surfaces.

Embodiment 13

The earth-boring tool of Embodiment 12, wherein the two beveled surfaces abut at a point intersected by the longitudinal axis of the cutting element.

Embodiment 14

The earth-boring rotary drill bit of Embodiment 12, wherein the two beveled surfaces abut at a point separated from the longitudinal axis of the cutting element by a distance that is greater than about five percent (5%) of a diameter of the cutting element.

Embodiment 15

A method of affixing a cutting element to an earth-boring tool, comprising: partially inserting a cutting element into a recess formed in the earth-boring tool; applying a molten braze material to a clearance between a lateral side of the cutting element and a lateral side of the recess; rotating the cutting element about a longitudinal axis within the recess; and fully inserting the cutting element within the recess until at least one alignment feature of a back face of the cutting element abuts at least one complementary alignment feature of a back surface of the recess and rotationally aligns the cutting element about the longitudinal axis within the recess to a predetermined rotational orientation.

Embodiment 16

The method of Embodiment 15, wherein fully inserting the cutting element within the recess comprises rotating the cutting element to a position within about forty-five (45) degrees or less away from the predetermined rotational orientation and applying a force substantially parallel to the longitudinal axis of the cutting element to seat the cutting element within the recess.

Embodiment 17

A method of forming a body of an earth-boring tool, comprising: forming a mold having a mold cavity including a shape corresponding to a shape of the body of the earth-boring tool to be formed; inserting a first portion of at least one displacement into at least one recess extending into the mold within the mold cavity, a second portion of the at least one displacement projecting into the mold cavity and having a generally cylindrical shape corresponding to a generally cylindrical shape of at least a portion of a cutting element to be attached to the body of the earth-boring tool to be formed; aligning the at least one displacement with respect to the mold by rotating the at least one displacement about a longitudinal axis of the at least one displacement; and affixing the aligned at least one displacement within the at least one recess.

Embodiment 18

The method of Embodiment 17, wherein the at least one displacement comprises at least one alignment feature on the first portion configured to rotationally align the at least one displacement with respect to the mold.

Embodiment 19

The method of Embodiments 17 or 18, wherein aligning the at least one displacement comprises inserting an alignment pin through a hole in the first portion of the at least one displacement and into a hole formed in the mold.

Embodiment 20

The method of any one of Embodiments 17 through 19, wherein the second portion of the at least one displacement comprises at least one feature configured to form alignment features in a cutting element recess in the earth-boring tool body formed in the mold cavity.

Although the foregoing description contains many specifics, these are not to be construed as limiting the scope of the present invention, but merely as providing certain embodiments. Similarly, other embodiments of the disclosure may be devised that do not depart from the scope of the present invention. For example, features described herein with reference to one embodiment also may be provided in others of the embodiments described herein. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

What is claimed is:

1. A method of affixing a cutting element to an earth-boring tool, comprising:
   providing a unitary cutting element comprising a cutting face, a lateral sidewall, and a back face, the back face comprising at least one structural alignment feature;
   defining a recess in a body of the earth-boring tool comprising a fixed-cutter earth-boring rotary drill bit, the recess having a lateral side surface and a back surface, the back surface of the recess comprising at least one complimentary structural alignment feature;
   partially inserting the unitary cutting element into the recess such that the lateral sidewall of the unitary cutting element is directly adjacent the lateral side surface of the recess, and such that the back face of the unitary cutting element faces the back surface of the recess without any structures located therebetween;
   applying a molten braze material to a clearance between the lateral sidewall of the unitary cutting element and the lateral side surface of the recess;
   rotating the unitary cutting element about a longitudinal axis within the recess;
   pressing the unitary cutting element into the recess to fully insert the unitary cutting element within the recess so that the at least one structural alignment feature of the back face of the unitary cutting element, which is partially offset from the longitudinal axis, directly abuts and contacts the at least one complementary structural alignment feature of the back surface of the recess, thereby rotating the unitary cutting element about the longitudinal axis within the recess to a specific predetermined rotational orientation and maintaining the unitary cutting element at the specific predetermined rotational orientation by preventing any further rotation of the unitary cutting element relative to the recess, the at least one structural alignment feature comprising one of at least one protrusion or at least one pocket defined in the back face of the unitary cutting element, the at least one complementary structural alignment feature comprising the other of the at least one protrusion or the at least one pocket defined on the back surface of the recess; and
   allowing the molten braze material to solidify to retain the cutting element in the recess by directly bonding at least the lateral sidewall of the cutting element to the earth-boring tool with the braze material.

2. The method of claim 1, wherein pressing the unitary cutting element into the recess to fully insert the unitary cutting element within the recess so that the at least one structural alignment feature of the back face of the cutting element, which is partially offset from the longitudinal axis, directly abuts and contacts the at least one complementary structural alignment feature of the back surface of the recess, thereby rotationally aligning the unitary cutting element about the longitudinal axis within the recess to a specific predetermined rotational orientation further comprises rotating the cutting element to a position within about forty-five (45) degrees or less away from the specific predetermined rotational orientation and applying a force substantially parallel to the longitudinal axis of the cutting element to seat the cutting element within the recess.

3. The method of claim 1, further comprising selecting the at least one structural alignment feature of the back face of the unitary cutting element and the at least one complementary structural alignment feature of the recess to comprise one or more beveled surfaces.

4. The method of claim 3, further comprising selecting the one or more beveled surfaces of the at least one structural alignment feature to abut at a point separated from the longitudinal axis of the unitary cutting element.

5. The method of claim 3, further comprising selecting the at least one structural alignment feature of the back face of the unitary cutting element and the at least one complementary structural alignment feature of the recess to each comprise two beveled surfaces.

6. The method of claim 4, further comprising selecting the one or more beveled surfaces of the at least one structural alignment feature to abut at a point separated from the longitudinal axis of the unitary cutting element by a distance offset from the longitudinal axis that is greater than five percent (5%) of a diameter of the unitary cutting element.

7. A method of affixing a cutting element to an earth-boring tool, comprising:
   forming a recess directly in a material of a body of an earth-boring tool with a back surface of the recess comprising an alignment structure;
   inserting a unitary cutting element into the recess of the body of the earth-boring tool, directly adjacent the material of the body, without intervening structures between a back face of the unitary cutting element and the back surface of the recess;
   applying a molten braze material to a clearance between a lateral side of the unitary cutting element and a lateral side of the recess; and
   abutting an alignment structure of the back face of the unitary cutting element with the alignment structure of the back surface of the recess to rotate the unitary cutting element about a longitudinal axis of the cutting element within the recess to a specific predetermined rotational orientation relative to the body, and precluding unintended rotation of the cutting element from the specific predetermined rotational orientation by maintaining direct contact between the alignment structure of the unitary cutting element and the alignment structure of the body.

8. The method of claim 7, wherein abutting the alignment structure of the back face of the unitary cutting element with the alignment structure of the back surface of the recess comprises mating one or more beveled surfaces of the alignment structure of the back face of the unitary cutting element with one or more beveled surfaces of the alignment structure of the recess.

9. The method of claim 7, wherein abutting the alignment structure of the back face of the unitary cutting element with the alignment structure of the back surface of the recess comprises mating two beveled surfaces of the alignment structure of the back face of the unitary cutting element with two beveled surfaces of the structure alignment features of the recess.

10. The method of claim 7, further comprising orienting an asymmetrical cutting face of the unitary cutting element about the longitudinal axis of the unitary cutting element.

11. The method of claim 7, further comprising orienting a planar cutting face of the unitary cutting element about the longitudinal axis of the unitary cutting element, the planar cutting face being oriented at an acute angle with respect to the longitudinal axis of the unitary cutting element.

12. The method of claim 11, further comprising orienting a second planar cutting face of the unitary cutting element about the longitudinal axis of the unitary cutting element, the second planar cutting face being oriented at an acute angle with respect to the longitudinal axis of the unitary cutting element.

13. A method of affixing a cutting element to an earth-boring tool, comprising:
   inserting a unitary cutting element into a recess defined directly by a body of the earth-boring tool without intervening structures between a back face of the unitary cutting element and a back surface of the recess;
   directly abutting an alignment feature of the unitary cutting element with a complementary alignment feature of the body in the recess to rotate the unitary cutting element about a longitudinal axis of the unitary cutting element within the recess to a specific predetermined rotational orientation, the alignment features comprising one of at least one protrusion or at least one pocket defined in the recess and the complementary alignment features comprising the other of the at least one protrusion or the at least one pocket defined on the unitary cutting element; applying a molten braze material to a clearance between a lateral side of the unitary cutting element and a lateral side of the recess; and precluding rotation of the unitary cutting element element about the longitudinal axis of the recess by maintaining direct contact between the alignment feature and the complementary alignment feature.

14. The method of claim 13, further comprising defining the recess in the earth-boring tool with at least one displacement in a mold of the earth-boring tool.

15. The method of claim 14, further comprising aligning the at least one displacement by inserting an alignment pin through a hole in a first portion of the at least one displacement and into a hole in the mold of the earth-boring tool.

16. The method of claim 14, further comprising aligning the at least one displacement with respect to the mold by placing a key in a key slot in the mold to align the at least one displacement.

17. The method of claim 14, further comprising affixing the aligned at least one displacement within the recess by inserting an alignment pin through a hole in the at least one displacement and through a corresponding hole in the mold to align and secure the at least one displacement in the mold.

* * * * *

UNITED STATES PATENT AND TRADEMARK OFFICE
CERTIFICATE OF CORRECTION

PATENT NO. : 10,702,937 B2
APPLICATION NO. : 15/269621
DATED : July 7, 2020
INVENTOR(S) : William H. Heuser Page 1 of 1

It is certified that error appears in the above-identified patent and that said Letters Patent is hereby corrected as shown below:

In the Specification

Column 1, Line 10, change "Nov. 1, 2016" to --Nov. 1, 2016,--

Signed and Sealed this
Eighth Day of September, 2020

Andrei Iancu
*Director of the United States Patent and Trademark Office*